United States Patent
Goo et al.

(10) Patent No.: US 9,987,985 B2
(45) Date of Patent: Jun. 5, 2018

(54) VEHICLE AND METHOD FOR CONTROLLING VEHICLE

(71) Applicant: Hyundai Motor Company, Seoul (KR)

(72) Inventors: Ja Yoon Goo, Ulsan (KR); Yeonji Kim, Seoul (KR); Ki Beom Kwon, Seoul (KR); Dae Jin An, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/225,487

(22) Filed: Aug. 1, 2016

(65) Prior Publication Data

US 2017/0267173 A1    Sep. 21, 2017

(30) Foreign Application Priority Data

Mar. 18, 2016   (KR) .......................... 10-2016-0032583

(51) Int. Cl.
| | | |
|---|---|---|
| *G06F 19/00* | (2018.01) | |
| *B60Q 9/00* | (2006.01) | |
| *B60R 1/00* | (2006.01) | |
| *B60R 1/12* | (2006.01) | |

(52) U.S. Cl.
CPC .............. *B60Q 9/008* (2013.01); *B60R 1/006* (2013.01); *B60R 1/12* (2013.01); *B60R 2001/1223* (2013.01)

(58) Field of Classification Search
None
See application file for complete search history.

(56) References Cited

U.S. PATENT DOCUMENTS 6,657,581 B1*  12/2003  Lippert et al. ................. 342/70
2005/0257975 A1*  11/2005  Cavin ...................... B60R 1/12
                                                                     180/169

(Continued)

FOREIGN PATENT DOCUMENTS

JP     H08241499 A     9/1996
JP     2007-001435 A   1/2007

(Continued)

OTHER PUBLICATIONS

Korean Notice of Allowance for Korean Application No. 10-2016-0032583, dated May 26, 2017, English Abstract, 1 page.

*Primary Examiner* — Brent Swarthout
(74) *Attorney, Agent, or Firm* — Mintz Levin Cohn Ferris Glovsky and Popeo, P.C.; Peter F. Corless

(57) ABSTRACT

A vehicle is provided and configured to allow a driver to recognize a degree of proximity of another vehicle by turning on a warning light differentially based on a degree of proximity of the other vehicle driving in a blind spot. The vehicle includes a rear lateral side detection unit that is configured to detect a rear lateral side including a blind spot and a side mirror including a mirror. A first indicator is disposed in the mirror and is configured to be turned on when a blind spot detection function is activated and a second indicator includes a plurality of indicators and is configured such that the number of a turned-on indicator is increased in a predetermined direction as a distance between the other vehicle, which is approaching in a blind spot, and a subject vehicle decreases, according to a detection result of the rear lateral side detection unit.

12 Claims, 12 Drawing Sheets

(56) References Cited

U.S. PATENT DOCUMENTS

| | | | | |
|---|---|---|---|---|
| 2007/0182527 A1* | 8/2007 | Traylor | ................... | B60Q 9/008 340/435 |
| 2009/0063053 A1* | 3/2009 | Basson | ................... | G08G 1/167 702/1 |
| 2011/0260845 A1* | 10/2011 | Henion | ..................... | B60R 1/08 340/435 |
| 2013/0043990 A1* | 2/2013 | Al-Jafar | ................. | B60Q 9/008 340/439 |
| 2015/0097660 A1 | 4/2015 | Adell | | |

FOREIGN PATENT DOCUMENTS

| | | |
|---|---|---|
| KR | 10-2001-0107461 A | 12/2001 |
| KR | 10-2002-0055627 A | 7/2002 |
| KR | 2007-0012887 A | 1/2007 |
| KR | 10-2014-0083241 A | 7/2014 |
| KR | 2014-0137807 A | 12/2014 |
| KR | 10-1563639 B1 | 10/2015 |

\* cited by examiner

FIG.5A
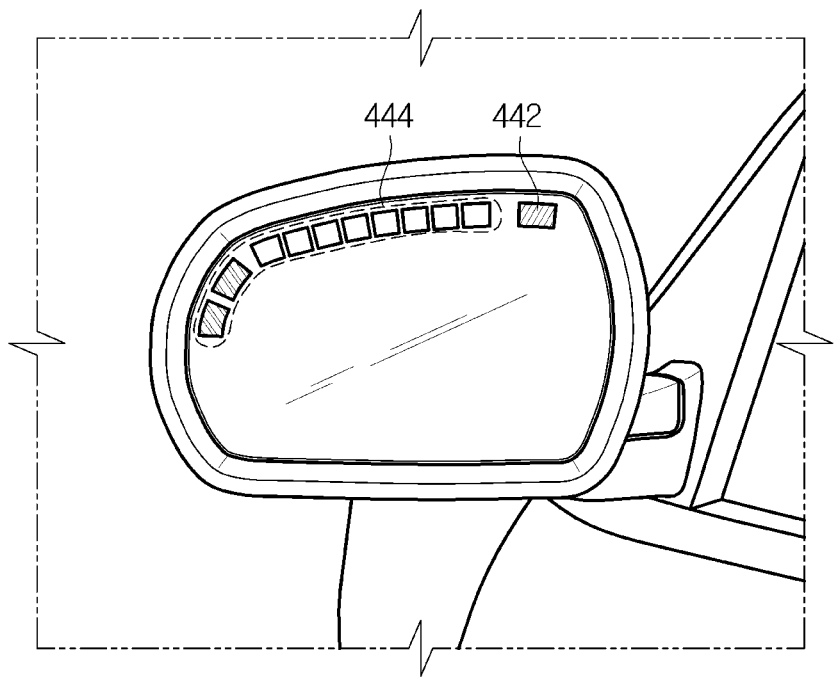
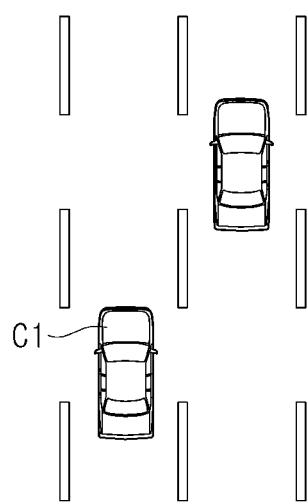

FIG.5B
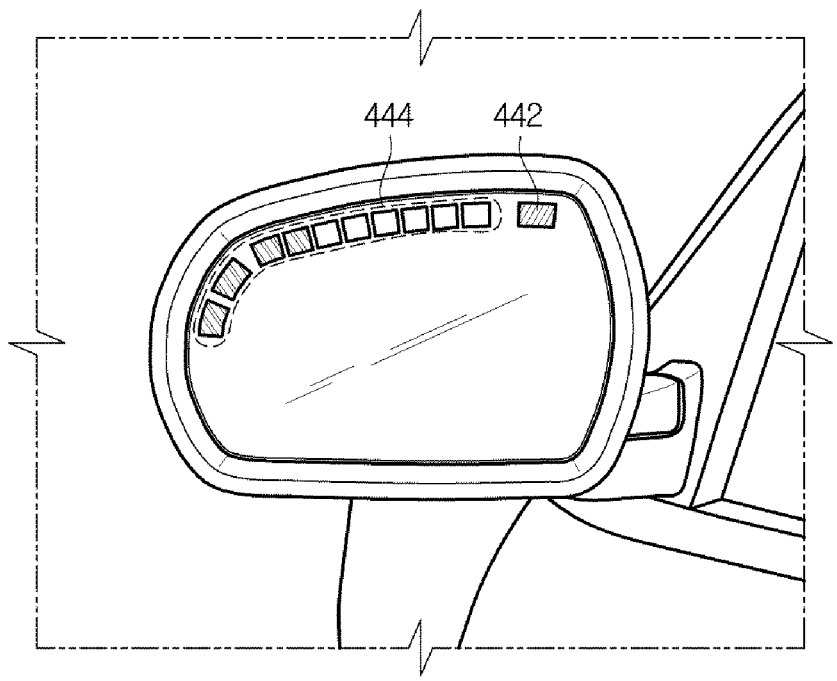
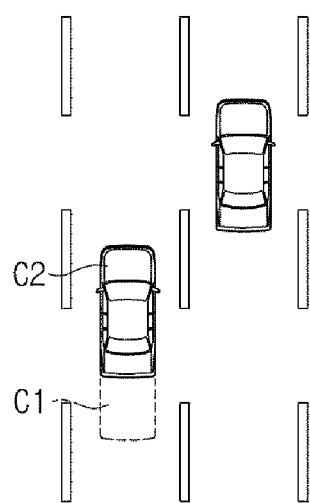

FIG.5C
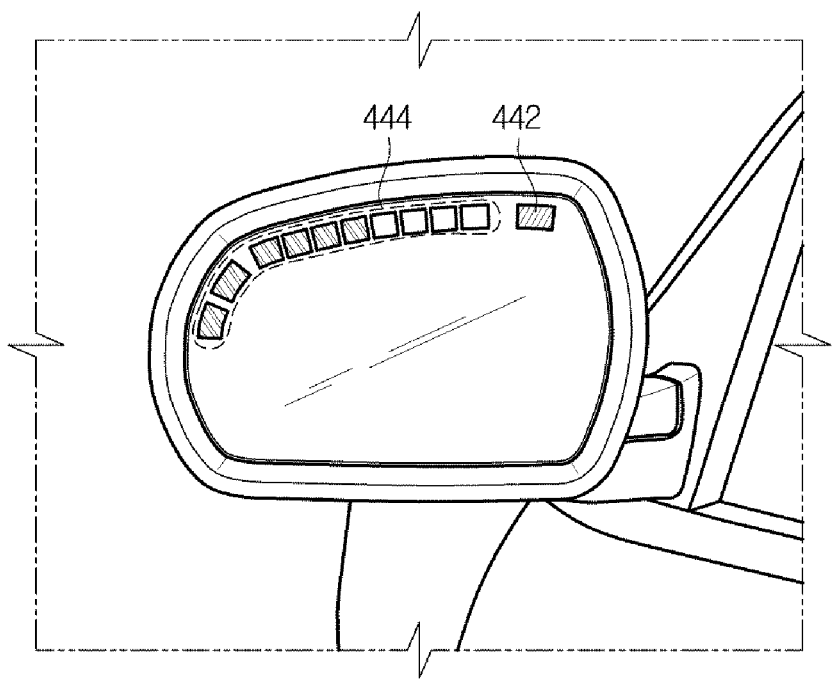
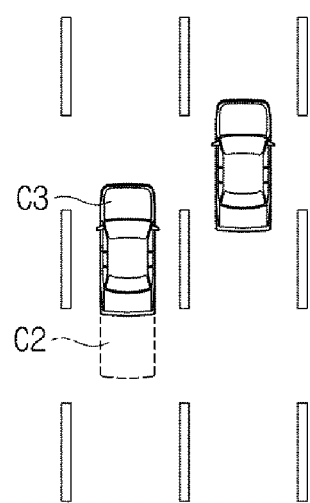

FIG.7A
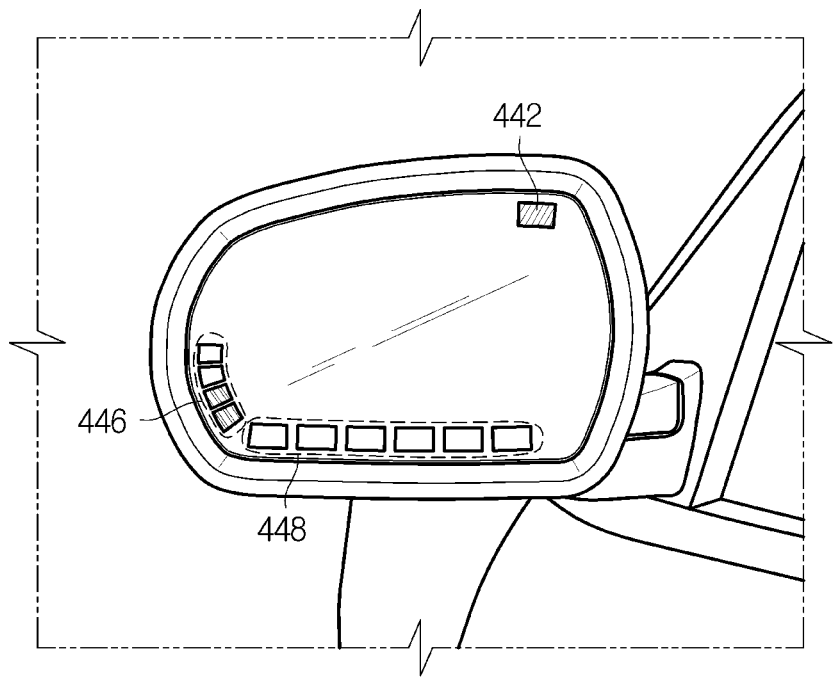
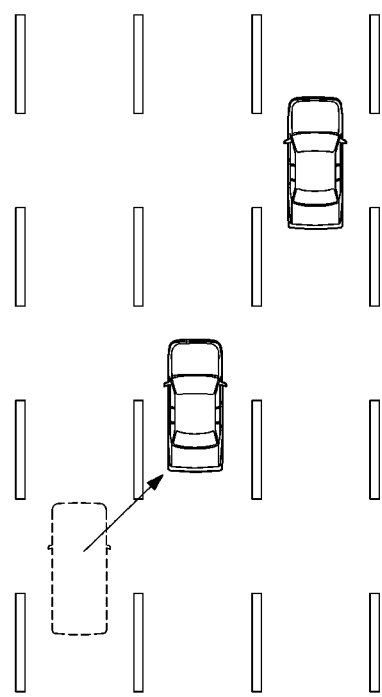

FIG.7B
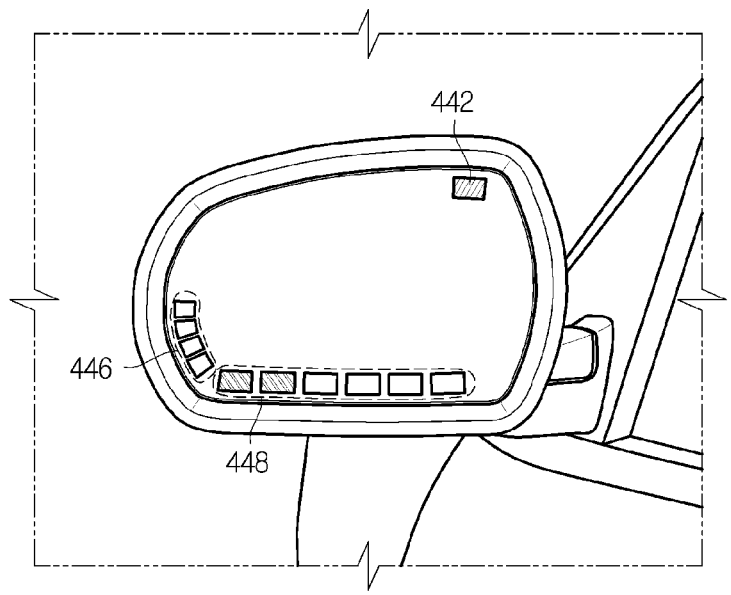
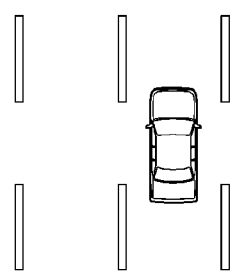
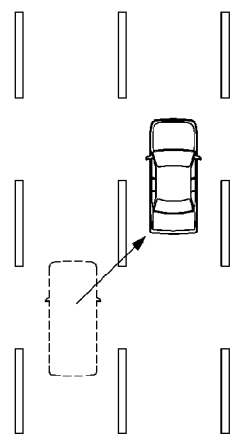

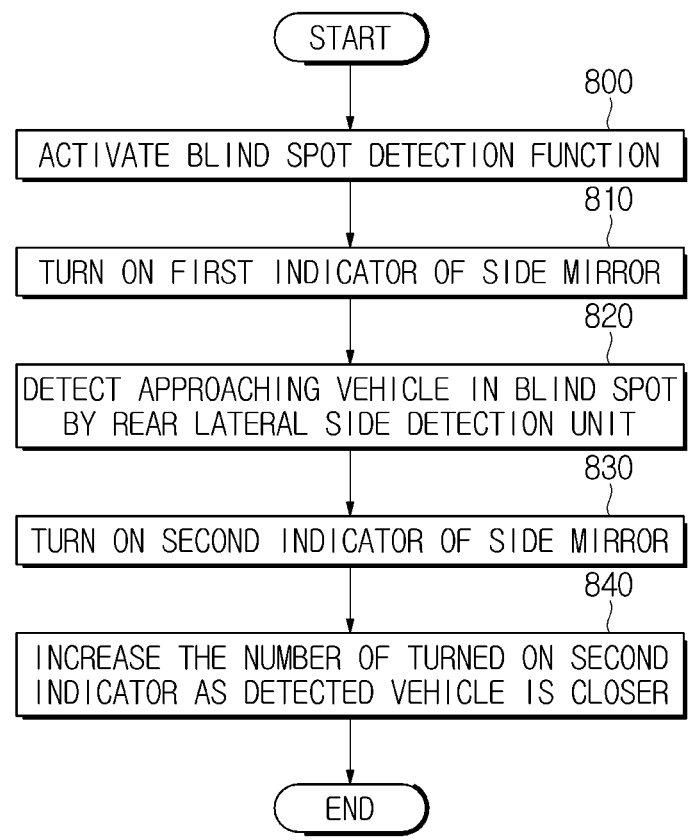

VEHICLE AND METHOD FOR CONTROLLING VEHICLE

CROSS-REFERENCE TO RELATED APPLICATION(S)

This application claims the benefit of Korean Patent Application No. 10-2016-0032583, filed on Mar. 18, 2016 in the Korean Intellectual Property Office, the disclosure of which is incorporated herein by reference.

BACKGROUND

1. Field of the Invention

The present disclosure relates to a vehicle and a method of controlling a vehicle, and more particular, to a vehicle that allows a driver to recognize a degree of proximity to other vehicles using a warning light.

2. Description of Related Art

When attempting to change a driving lane, a user may check for other vehicles being driven at a rear side thereof using a side mirror of the vehicle. However, when another vehicle is in the blind spot of the side mirror, the driver may be unable to detect or view the other vehicle using the side mirror and thus it may be difficult to avoid a collision risk when changing the driving lane.

Recently, a blind spot detection technology has been developed to inform a driver of the presence of another vehicle by detecting the other vehicle in a blind spot of a side mirror. A blind spot detection function may be typically configured to inform a driver that another vehicle is in a blind spot by turning on a warning light embedded in a side mirror.

SUMMARY

According to an aspect of the present disclosure, a vehicle may be configured to allow a driver to recognize a degree of proximity of other surrounding vehicles by turning on a warning light differentially based on a degree of proximity of the other vehicle driving in a blind spot, and a control method of the vehicle. Additional aspects of the present disclosure will be set forth in part in the description which follows and, in part, will be obvious from the description, or may be learned by practice of the present disclosure.

In accordance with one aspect of the present disclosure, a vehicle may include: a rear lateral side detection unit configured to detect a rear lateral side including a blind spot; and a side mirror including a mirror, a first indicator disposed in the mirror and configured to be turned on when a blind spot detection function is activated; and a second indicator having a plurality of indicators and configured such that the number of a turned-on indicator is increased in a predetermined direction as a location of another vehicle, which is approaching in a blind spot, is closer to a subject vehicle, according to a detection result of the rear lateral side detection unit.

In particular, the second indicator may be disposed in an edge of an upper portion of the mirror. The second indicator may be arranged to correspond to the shape of the upper portion of the mirror. The first indicator and the second indicator may be configured to emit different colors. The vehicle may further include: a controller configured to determine a location of another vehicle driven in a blind spot based on a detection result of the rear lateral side detection unit, and configured to determine the number of a turned-on second indicator and a turning-on direction of the second indicator.

The side mirror may further include a third indicator having a plurality of indicators disposed in an edge of a lower lateral side of the side mirror. The third indicator may be configured such that the number of a turned-on indicator increases in a predetermined direction, as a time to collision of the other vehicle, which is approaching in a rear lateral side of the subject vehicle while being moved from a second lane to a driving lane of the vehicle to a next lane to a driving lane of the vehicle, is decreased, based on a detection result of the rear lateral side detection unit.

Additionally, the vehicle may further include: a controller configured to calculate a time to collision of the other vehicle, which is approaching in the rear lateral side of the subject vehicle while being moved from a second lane to a driving lane of the vehicle to a next lane to a driving lane of the vehicle based on a detection result of the rear lateral side detection unit, and configured to determine the number of a turned-on third indicator and a turning-on direction of the third indicator, based on the calculated time to collision.

The side mirror may further include a fourth indicator having a plurality of indicators disposed in an edge of a lower portion of the side mirror. The fourth indicator may be configured such that the number of a turned-on indicator increases in a predetermined direction as a time to collision of the other vehicle, which is approaching from a next lane to a driving lane of the subject vehicle to the rear lateral side of the subject vehicle, decreases, based on a detection result of the rear lateral side detection unit.

The vehicle may further include: a controller configured to calculate a time to collision of the other vehicle, which is approaching from a next lane to a driving lane of the subject vehicle to the rear lateral side of the subject vehicle based on a detection result of the rear lateral side detection unit, and configured to determine the number of a turned-on fourth indicator and a turning-on direction of the fourth indicator, based on the calculated time to collision.

In accordance with one aspect of the present disclosure, a control method of a vehicle may include: turning on a first indicator of a side mirror when a blind spot detection function is activated; turning on a second indicator of the side mirror when a rear lateral side detection unit detects another vehicle, which is approaching in a blind spot; and increasing the number of a turned-on second indicator in a predetermined direction, as a location of the other vehicle, which is approaching in a blind spot, is closer to the subject vehicle, based on a detection result of the a rear lateral side detection unit.

The increasing of the number of a turned-on second indicator in a predetermined direction, may include determining a location of the other vehicle driven in a blind spot based on a detection result of the rear lateral side detection unit, and determining the number of the turned-on second indicator and a turning-on direction of the second indicator, based on a degree of proximity to the vehicle in the determined location.

The control method further include: turning on a third indicator of the side mirror when the rear lateral side detection unit detects the other vehicle, which is approaching in a rear lateral side of the subject vehicle while being moved from a second lane to a driving lane of the vehicle to a next lane to a driving lane of the vehicle; calculating a time to collision of the other vehicle, which is approaching in the rear lateral side of the subject vehicle, based on a detection result of rear lateral side detection unit; and increasing the number of a turned-on third indicator in a predetermined direction as the calculated time to collision decreases.

The control method may further include: turning on a fourth indicator of the side mirror when the rear lateral side detection unit detects the other vehicle, which is approaching from a next lane to a driving lane of the subject vehicle to the rear lateral side of the vehicle; calculating a time to collision of the other vehicle, which is approaching in the rear lateral side of the subject vehicle, based on a detection result of rear lateral side detection unit; and increasing the number of a turned-on fourth indicator in a predetermined direction, as the calculated time to collision decreases.

BRIEF DESCRIPTION OF THE DRAWINGS

These and/or other aspects of the disclosure will become apparent and more readily appreciated from the following description of exemplary embodiments, taken in conjunction with the accompanying drawings of which:

FIGS. 5A to 5C are views illustrating when a second indicator of a side mirror differentially warns according a degree of proximity of the other vehicle driving in a blind spot in accordance with an exemplary embodiment of the present disclosure;

FIGS. 7A to 7B are views illustrating when a third indicator and a fourth indicator of a side mirror differentially warns according a degree of proximity of the other vehicle driving in a second lane to a driving lane of the vehicle or a next lane to the driving lane of the vehicle in accordance with an exemplary embodiment of the present disclosure; and FIGS. 8 and 9 are flow charts of a control method of a vehicle in accordance with an exemplary embodiment.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
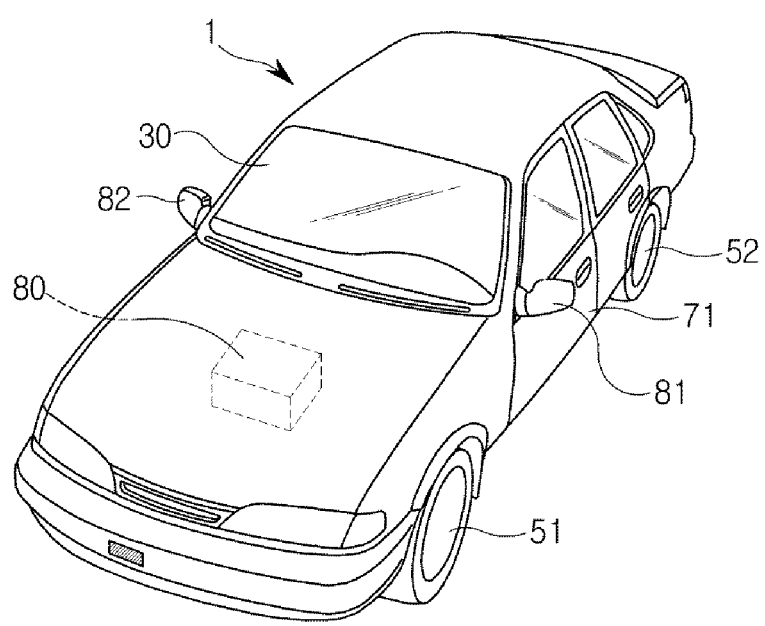
FIG. 1 is a view illustrating an exterior of a vehicle in accordance with an exemplary embodiment of the present disclosure.
Figure 2:
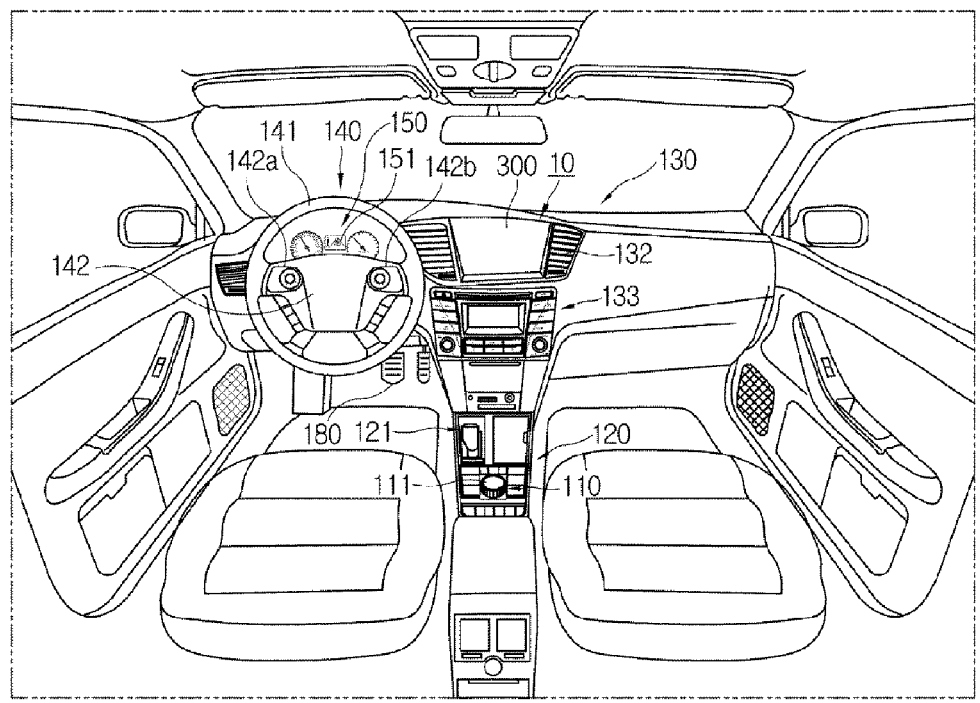
FIG. 2 is a view illustrating an internal configuration of a vehicle in accordance with an exemplary embodiment of the present disclosure.

Reference will now be made in detail to exemplary embodiments of the present disclosure, examples of which are illustrated in the accompanying drawings. FIG. 1 is a view illustrating an exterior of a vehicle in accordance with an exemplary embodiment of the present disclosure, and FIG. 2 is a view illustrating an internal configuration of a vehicle in accordance with an exemplary embodiment of the present disclosure.

Referring to FIG. 1, according an exemplary embodiment a vehicle may include a body 1 that forms an exterior of the vehicle, vehicle wheels 51 and 52 configured to move the vehicle, a driving device 80 configured to drive the vehicle wheels 51 and 52, a door 71 that closes and protects the inside of the vehicle from the outside, a front glass 30 that provides a front view of the vehicle to a driver inside the vehicle, and a side mirror 440 that provides a view of a rear side of the vehicle to the driver.

The vehicle wheels 51 and 52 may include a front wheel 21 disposed on a front of the vehicle and a rear wheel 52 disposed on a rear of the vehicle. The driving device 80 may be configured to supply a torque to a front wheel 51 or a rear wheel 52 to move the body 1 back and forth. The driving device 80 may include an engine configured to generate a torque by burning the fossil or a motor configured to generate a torque by receiving the power from a battery (not shown).

Further, the door 71 may be rotatably disposed on a right side and a left side of the body 1. When the door 71 is opened, a driver may be allowed to be seated within the vehicle, and when the door 71 is closed, the inside of the vehicle may be closed from the outside. The front glass 30 that is referred to as "windshield glass" may be disposed on an upper portion of the front of the body 1. A driver inside the vehicle may view the front side of the vehicle via the front glass 30.

The side mirror 400 may include a left side mirror 400L disposed on the left side of the body 1 and a right side mirror 400R disposed on the right side of the body 1. The driver inside of the vehicle may visually recognize situations of the lateral side and the rear side of the vehicle. According to an exemplary embodiment, the vehicle may provide a blind spot detection warning function. The blind spot detection warning function may be configured to allow a driver to recognize other vehicles driving or disposed in a blind spot of the subject vehicle by turning on an indicator that includes a light emitting unit embedded in the side mirror when detecting other vehicles in the blind spot. According to an exemplary embodiment, the side mirror may include an indicator configured to be differentially turned on based on a degree of proximity to other vehicles traveling in the blind spot of the subject vehicle or traveling within a predetermined distance to the rear lateral side of the subject vehicle. A detailed description thereof will be described later.

In addition, the vehicle may include a variety of sensors to help a driver to recognize a situation of the surroundings of the vehicle by detecting an obstacle adjacent to or surrounding the vehicle. For example, the vehicle may include a plurality of imaging devices (e.g., cameras, video cameras, etc.) configured to acquire images of the front, rear, left and right side of the vehicle.

As illustrated in FIG. 2, the vehicle may include a dashboard in which a gear box 120, a center fascia 130, a steering wheel steering wheel 140 and a gauge board 150 may be disposed. In the gear box 120, a gear lever 121 configured to change a speed of the vehicle may be installed. As illustrated in the drawings, in the gear box 120, an input device 110 including a dial operation unit 111 and a variety of buttons may be disposed to operate a function of a multi-media device including a navigation device 10 or an audio device 133, and an operation of main functions of the vehicle.

In the center fascia 130, an air conditioning device 132, an audio device 133 and a navigation device 10 may be installed. The air conditioning device may be used to maintain a desired air temperature inside the vehicle by adjusting a temperature, a moisture, an air cleanliness, and a flow of air of the inside of the vehicle. The air conditioning device may include at least one discharging port 132 installed in the center fascia 130 and configured to discharge air. A button or a dial may be installed in the center fascia 130 to operate the air conditioning device 131. A user such as a driver may operate the air conditioning device using a button or dial disposed on the center fascia. In addition, the user may operate the air conditioning device using buttons or the dial operation unit 111 of the input device 110 installed in the gear box 120.

According to an exemplary embodiment, in the center fascia 130, the navigation device 10 may be installed. The navigation device 10 may be embedded in the center fascia 130 of the vehicle. An input unit configured to operate the navigation device 10 may be installed in the center fascia 130. Alternatively, the input unit of the navigation device 10 may be installed in another position other than the center fascia 130. For example, the input unit of the navigation device 10 may be formed around a display unit 300 of the navigation device 10. Alternatively, the input unit of the navigation device 10 may be installed in the gear box 120.

Further, the steering wheel steering wheel 140 may be a device configured to adjust a driving direction of the vehicle, and may include a rim 141 held by the driver and a spoke 142 connected to a steering system of the vehicle and configured to connect the rim 141 to a hub of a rotation shaft for the steering. According to the exemplary embodiment, manipulation devices 142a and 142b may be formed in the spoke 142 to operate various devices inside the vehicle, such as an audio device. The steering wheel 140 may perform a function of warning a driver to enhance safe driving. For example, the steering wheel 140 may output a warning to a driver regarding a drowsy driving state in a tactual manner through a vibration when the driver is detected to be sleeping or drowsy while driving, or the steering wheel 140 may be configured to output a warning regarding an accident by the vibration when a risk of accident occurs due to the change in the driving condition.

A variety of gauge boards 150 indicating a driving speed of the vehicle and revolutions per minute (RPM) or fuel residual quantity may be installed in the dashboard. The gauge board 150 may include a gauge display unit 151 configured to indicate or display information related to the vehicle's condition and the vehicle's driving, and information related to operation of multi-media device.

In a conventional manner, a blind spot detection function may be configured to output a warning to a driver regarding the presence of other vehicles in a blind spot by turning on a warning light of a side mirror without providing a warning regarding the proximity of the other vehicle to the subject or traveling vehicle. However, according to an exemplary embodiment, a vehicle may provide a side mirror including an indicator that is configured to be differentially turned on based on a position of the other vehicle to inform a driver of a degree of proximity to the other vehicle in a blind spot. Hereinafter a detailed description thereof will be described in details. In other words, the risk of collision may be reduced by providing a driver with the proximity of surrounding vehicles that are traveling in a blind spot of the subject vehicle.

Figure 3:
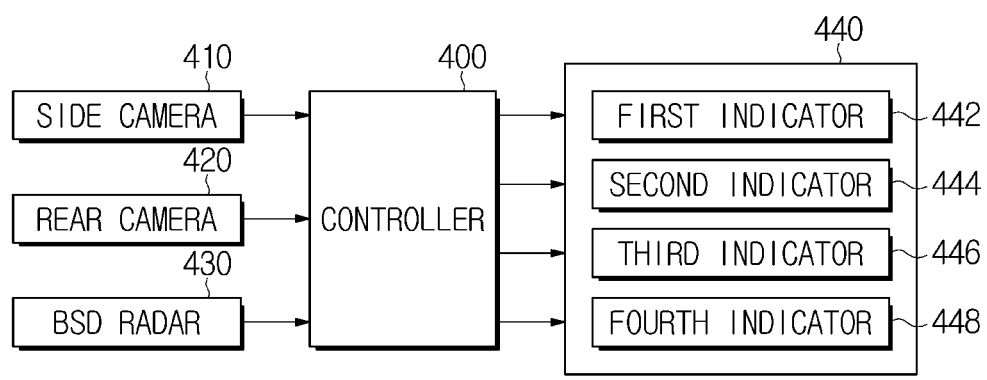
FIG. 3 is a control block diagram of a vehicle in accordance with an exemplary embodiment of the present disclosure.
Figure 4:
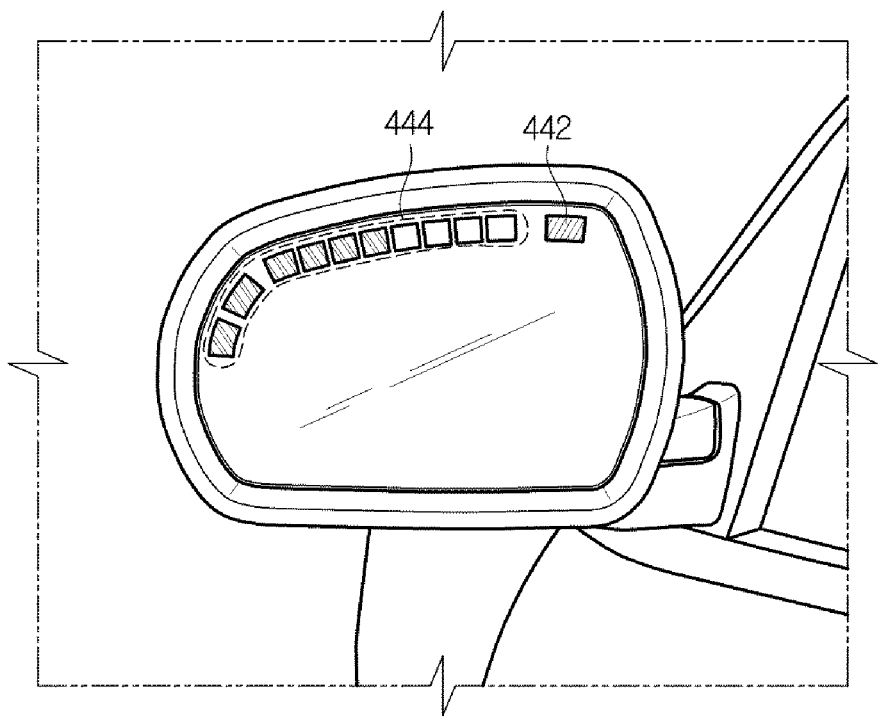
FIG. 4 is a view of a first indicator and a second indicator of a side mirror in accordance with an exemplary embodiment of the present disclosure.

FIG. 3 is a control block diagram of a vehicle in accordance with an exemplary embodiment of the present disclosure, and FIG. 4 is a view of a first indicator 442 and a second indicator 444 of a side mirror in accordance with an exemplary embodiment of the present disclosure. FIGS. 5A to 5C are views illustrating a case in which a second indicator 444 of a side mirror differentially warns based on a degree of proximity of other vehicles driving in a blind spot in accordance with an exemplary embodiment of the present disclosure.

Referring to FIG. 3, according to an exemplary embodiment, the vehicle may include a rear lateral side detection unit including a rear camera 420 (e.g., imaging device) configured to acquire an image of a rear side of the vehicle, a side camera 410 configured to acquire an image of a lateral side of the vehicle, and a blind spot detection radar (BSD radar) 430 configured to detect an object in a blind spot of a side mirror, a controller 400 configured to operate an indicator of the side mirror based on the result of detection by the rear and side detection unit, and a side mirror that includes a first indicator 442 and a second indicator 444.

The camera of the rear lateral side detection unit may be disposed at any location on the vehicle where an image may be acquired of the rear side and the left and right side of the vehicle. The camera may include Charge-Coupled Device (CCD) sensor and Complementary Metal-Oxide Semiconductor (CMOS) sensor. The BSD radar 430 may be a distance sensor configured to detect an object place in the blind spot of the side mirror. The BSD radar 430 may be installed at any location where capable of detecting a rear and lateral area of the vehicle including the blind spot. According to an exemplary embodiment, the BSD radar 430 may be configured to detect an object disposed in the blind spot of the side mirror to calculate a distance to the detected object.

The side mirror may include a first indicator 442, a second indicator 444, a third indicator 446 and a fourth indicator 448, embedded in the mirror. Hereinafter for the convenience of description, a side mirror disposed in a driver seat side will be described as an example. As illustrated in FIGS. 5A to 5C, the first indicator 442 may be configured to inform a driver that the blind spot detection function is in operation by being turned on when the blind spot detection function is activated. When the blind spot detection function is activated, the controller 400 may be configured to generate a signal configured to turn on the first indicator 442 and output to the first indicator 442 so that the first indicator 442 is interlocked with an operation of the blind spot detection function to be turned on.

The first indicator 442 may include a single light emitting unit, and a light-emitting diode (LED) may be used as the light emitting unit, but is not limited thereto. The first indicator 442 may be configured to emit a color e.g. a green color, which is different from the second indicator 444 described later. The driver may intuitively recognize whether to operate the rear lateral side detection unit through the turning on/off of the first indicator 442. The location of the first indicator 442 as illustrated in FIG. 4 is merely exemplary and thus the first indicator 442 may be disposed at a different position.

As illustrated in FIG. 4, the second indicator 444 may include a plurality of indicators arranged along an edge of the side mirror in a linear shape from a middle portion of the left side of the side mirror to the first indicator 442 disposed on an upper portion of the side mirror. Each indicator forming the second indicator 444 may be formed by a single light emitting unit. Therefore, the second indicator 444 may include a plurality of light emitting units. The location and the number of the second indicator 444 as illustrated in FIG. 4 is an example, and thus the second indicator 444 may be provided at a different location and in different numbers. The second indicator 444 and the first indicator 442 may be configured to emit a different color from each other. For example, the first indicator 442 may be configured to emit a green color, and the second indicator 444 may be configured to emit a yellow color or a red color.

The second indicator 444 may be turned on when the rear and side detection unit detects another vehicle driven in the blind spot of the side mirror, when the blind spot detection function is activated. According to an exemplary embodiment, the second indicator 444 of the side mirror may be provided such that the number of a turned-on second indicator 444 is increased in a predetermined direction as the location of the other vehicle to the vehicle decreases. In other words, when the rear lateral side detection unit detects another vehicle being driven in the blind spot of the side mirror, the controller 400 may be configured to determine the number of a turned-on second indicator 444 and a turning on direction of the second indicator 444 based on a distance from the detected vehicle to the subject vehicle (e.g., the vehicle in which the claimed system is mounted).

For example, as illustrated in FIG. 5A, when the other vehicle is detected in the blind spot, the controller 400 may be configured to calculate a distance from the detected vehicle to the subject vehicle. When the detected vehicle is determined to be at a maximum distance from the subject vehicle within the blind spot based on the calculated distance, the controller 400 may be configured to turn on two of indicators that are the lowest of the second indicator 444. The second indicator 444 may be configured to pre-store data related to the number of the turned-on second indicator 444 based on the variation of the distance between the other vehicle in the blind spot and a subject vehicle When a distance from the detected vehicle driven in the blind spot to the vehicle is less than as illustrated in FIG. 5A based on the result of the detection of the rear lateral side detection unit, the controller 400 may be configured to determine the number of the turned-on indicator corresponding to the decreased distance between the detected vehicle in the blind spot and the subject vehicle, and may be configured to turn on two more indicators, which are consecutively arranged from the indicator that is already turned on, based on the determination, as illustrated in FIG. 5B.

In addition, when a distance from detected vehicle driven in the blind spot to the subject vehicle is less than as illustrated in FIG. 5B based on the result of the detection of the rear lateral side detection unit, the controller 400 may be configured to determine the number of the turned on indicator corresponding to the decreased distance between the detected vehicle in the blind spot and the subject vehicle, and may be configured to turn on two more indicators, which are consecutively arranged from the indicator that is already turned on, based on the determination, as illustrated in FIG. 5C.

According to an exemplary embodiment, the second indicator 444 may allow a driver to recognize that the detected vehicle is gradually approaching the subject vehicle by increasing the number of the turned-on indicators as the detected vehicle in the blind spot approaches to the subject vehicle. In FIGS. 5A to 5C, the indicator is illustrated with two of the indicators turned on at a time, but is not limited thereto. Accordingly, the pre-determined number of the indicators, which is determined based on a distance between the detected vehicle and the subject vehicle, may be turned on.

When the other vehicle in the blind spot approaches to the subject vehicle as illustrated in FIG. 5C and is then further away from the subject vehicle as illustrated in FIG. 5B (e.g., the distance to the subject vehicle increases), the controller 400 may be configured to turn off two of indicators that are most recently turned on. Similarly, when the other vehicle in the blind spot is distanced to the vehicle as illustrated in FIG. 5A and then the distance to the subject vehicle increases as illustrated in FIG. 5B, the controller 400 may be configured to turn off two of indicators that are most recently turned on. In other words, when the number of the turned on-second indicators 444 is increased, the driver may intuitively recognize that the other vehicle driven in the blind spot is approaching the vehicle. Similarly, when the number of the turned-off second indicators 444 is increased, the driver may intuitively recognize that the other vehicle driven in the blind spot is distanced from the vehicle.

As mentioned above, the controller 400 may be configured to calculate a distance between the detected vehicle driven in the blind spot and the subject vehicle based on the detection result of the rear lateral side detection unit, and may be configured to turn on the second indicator 444 based on the calculated distance. However, according to another exemplary embodiment, the controller 400 may be configured to calculate a time to collision between the detected vehicle driven in the blind spot and the subject vehicle based on the detection result of the rear lateral side detection unit, and increase the number of the turned-on second indicators 444 as the calculated time to collision decreases.

The second indicator 444 may be emitted to have a single color, e.g. a red color. Alternatively, the turned-on second indicator 444 may be emitted as a yellow color in FIG. 5A, the turned-on second indicator 444 may be emitted as a yellow red color in FIG. 5B, and the turned-on second indicator 444 may be emitted as a red color in FIG. 5C. In other words, the second indicator 444 may be provided such that the color of the second indicator 444 may be more similar to red color as the detected vehicle driven in the blind spot approaches the subject vehicle.

As mentioned above, the side mirror may include the second indicator 444 configured to be turned on based on the detection result of the other vehicle driven in the blind spot, and the third indicator 446 and the fourth indicator 448 configured to be turned on based on a degree of proximity of detected vehicle driven in a rear lateral side of the subject vehicle and a rear side of the subject vehicle other than the blind spot.

Figure 6:
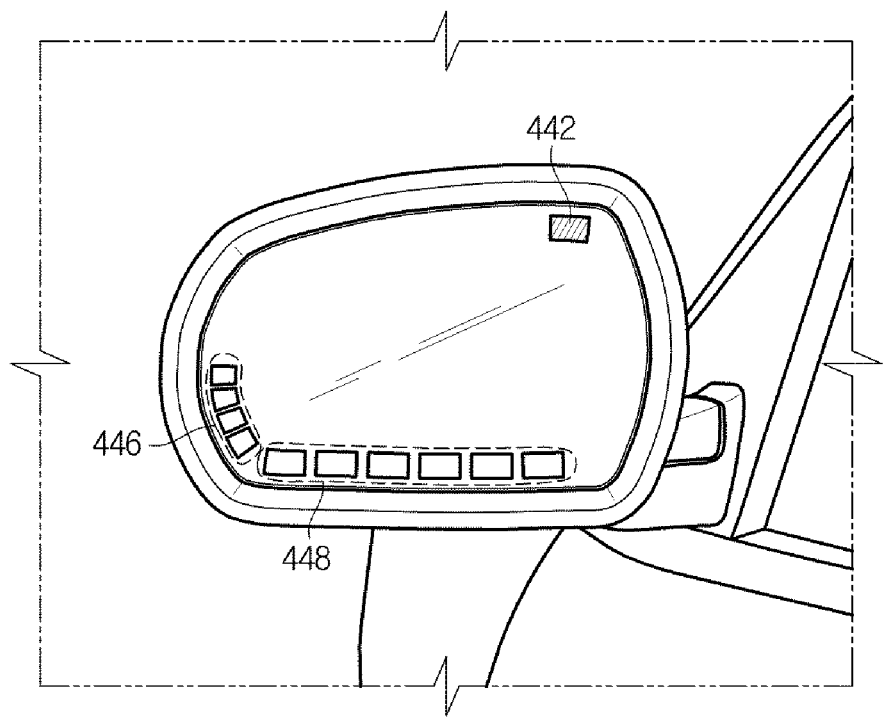
FIG. 6 is a view of a third indicator and a fourth indicator of a side mirror in accordance with an exemplary embodiment of the present disclosure.

As illustrated in FIG. 6, the third indicator 446 may include a plurality of indicators arranged along an edge of the side mirror in a linear shape from a middle portion of the left side of the side mirror to the first indicator 442 disposed on a lower portion of the side mirror. Each indicator forming the third indicator 446 may be formed by a single light emitting unit. Therefore, the third indicator 446 may include a plurality of light emitting units. As illustrated in FIG. 6, the fourth indicator 448 may include a plurality of indicators arranged along an edge of a lower end of the side mirror in a linear shape. Each indicator forming the fourth indicator 448 may be formed by a single light emitting unit. Therefore, the fourth indicator 448 may include a plurality of light emitting units.

The third indicator 446 and the fourth indicator 448 may indicate that a degree of proximity of the other vehicle that is approaching to the rear lateral side or the rear side of the subject vehicle using the number of the turned on third indicator 446 and fourth indicator 448, in the same way of the second indicator 444. The third indicator 446 may be turned on when a direction of the other vehicle approaching to the subject vehicle is in the rear lateral side of the vehicle, and the fourth indicator 448 may be turned on when a direction of the other vehicle approaching to the subject vehicle is in the rear side of the vehicle.

In other words, the installation location of the third indicator 446 and the fourth indicator 448 may be set to correspond to an approaching direction of the other vehicle approaching the subject vehicle. The location of the third indicator 446 corresponding to a lower portion of the lateral side of the side mirror may be provided to correspond to an approaching direction of the other vehicle, when the third indicator 446 is turned on, that is, to correspond to the approaching to the rear lateral side of the subject vehicle. Similarly, the location of the fourth indicator 448 corresponding to a lower portion of the side mirror may be provided to correspond to an approaching direction of the other vehicle when the fourth indicator 448 is turned on, that is, to correspond to the approaching to the rear side of the subject vehicle.

Therefore, the driver may intuitively recognize that the other vehicle is approaching in the rear lateral side of the subject vehicle, when the third indicator 446 is turned on, and in the same way, the driver may intuitively recognize that the other vehicle is approaching in the rear side of the subject vehicle, when the fourth indicator 448 is turned on. In other words, the driver may intuitively recognize an approaching direction of the other vehicle through turning on/off of the third indicator 446 or the fourth indicator 448. The location and the number of the third indicator 446 and the fourth indicator 448 as illustrated in FIG. 6 are merely an example, but the third indicator 446 and the fourth indicator 448 may be disposed in other location and may be provided in different numbers. However, as mentioned above, the third indicator 446 and the fourth indicator 448 may be disposed to correspond to the approaching direction of the other vehicle.

When the blind spot detection function is activated and when the rear lateral side detection unit detects that the other vehicle is approaching the rear lateral side of the subject vehicle, the third indicator 446 may be turned on. According to an exemplary embodiment, the third indicator 446 of the side mirror may be provided such that the number of the turned on 446 is increased in a predetermined direction as a time to collision with the other vehicle driven in the rear lateral side of the subject vehicle decreases. In other words, when the rear lateral side detection unit detects the other vehicle driven in the rear lateral side of the subject vehicle, the controller 400 may be configured to calculate a time to collision with the detected vehicle and determine the number of a turned-on third indicators 446 based on the calculated time to collision.

As illustrated in FIG. 7A, when the other vehicle is detected to be moved from a second lane to a driving lane of the subject vehicle to a next lane to the driving lane of the vehicle, the controller 400 may be configured to calculate a time to collision with the detected vehicle. The controller 400 may further be configured to turn on a single third indicator 446 in the lowest thereof when the calculated time to collision is determined to be less a predetermined reference time. The controller 400 may be configured to increase the number of the third indicator 446 by turning on one indicator that is consecutively arranged from the turned on indicators, as a time to collision with the other vehicle decreases. The controller 400 may further be configured to pre-store data related to the number of the third indicators 446 turned on according to the variation of the time to collision with the other vehicle.

According to an exemplary embodiment, the third indicator 446 may allow a driver to recognize that the other vehicle is gradually approaching the subject vehicle by increasing the number of the turned on indicators 446 as a time to collision with the other vehicle decreases. As mentioned above, the third indicator 446 is illustrated to be turned on by one at a time, but is not limited thereto. A pre-determined number of the indicators may be turned on simultaneously, wherein the pre-determined number is pre-determined according to the time to collision with the other vehicle.

When a time to collision with the other vehicle elapses, the controller 400 may be configured to turn off one indicator that is most recently turned on by one by one. In other words, the driver may intuitively recognize that the other vehicle driven in the rear lateral side of the subject vehicle is approaching the subject vehicle when the number of the turned on third indicators 446 is increased. Similarly, the driver may intuitively recognize that the other vehicle driven in the rear lateral side of the subject vehicle is at a further distance from the subject vehicle when the number of the turned off third indicators 446 increases.

As mentioned above, the controller 400 may be configured to calculate a time to collision with the other vehicle, which is driven in the rear lateral side of the vehicle, based on the detection result of the rear lateral side detection unit, and turn on the third indicator 446 based on the calculated time to collision. According to another exemplary embodiment, the controller 400 may be configured to calculate a distance between the other vehicle, which is driven in the rear lateral side of the vehicle, and the subject vehicle, and turn on the third indicator 446 based on the calculated distance. The third indicator 446 may be configured to emit a single color, e.g. a red color, as the same as the second indicator 444. Alternatively, the third indicator 446 may be configured to have a color that is more similar to the red color as the time to collision with the other vehicle decreases.

When the blind spot detection function is activated and when the rear lateral side detection unit detects that the other vehicle is approaching the rear side of the subject vehicle, the fourth indicator 448 may be turned on. According to an exemplary embodiment, the fourth indicator 448 of the side mirror may be provided such that the number of the turned on indicators 448 is increased in a predetermined direction as a time to collision with the other vehicle driven in the rear side of the vehicle decreases. In other words, when the rear lateral side detection unit detects the other vehicle driven in the rear lateral side of the vehicle, the controller 400 may be configured to calculate a time to collision of the detected vehicle and determine the number of the turned-on fourth indicators 448, according to the calculated time to collision.

For example, as illustrated in FIG. 7B, when the other vehicle is detected to be moved from a next lane to a driving lane of the subject vehicle to the driving lane of the vehicle, the controller 400 may be configured to calculate a time to collision with the detected vehicle. The controller 400 may then be configured to turn on two of the fourth indicators 448 in the most left side thereof when the calculated time to collision is determined to be less than a predetermined reference time. The controller 400 may be configured to increase the number of the fourth indicator 448 by turning on two indicators consecutively arranged from the turned on indicators, as a time to collision with the other vehicle decreases. The controller 400 may be configured to pre-store data related to the number of the fourth indicator 448 turned on according to the variation of the time to collision with the other vehicle.

In other words, the fourth indicator 448 may allow a driver to recognize that the other vehicle is gradually approaching the subject vehicle by increasing the number of the turned on fourth indicator 448 as a time to collision of the other vehicle decreases. As mentioned above, the fourth indicator 448 is illustrated to be turned on by two at a time, but is not limited thereto. A pre-determined number of the indicator may be turned on, wherein the pre-determined number is pre-determined according to the time to collision with the other vehicle.

When a time to collision with the other vehicle elapses, the controller 400 may be configured to turn off one indicator, which is most recently turned on, by one by one. In other words, the driver may intuitively recognize that the other vehicle driven in the rear side of the subject vehicle is approaching the subject vehicle when the number of the turned on fourth indicator 448 is increased. Similarly, the driver may intuitively recognize that the other vehicle driven in the rear side of the subject vehicle is at a greater distance from the subject vehicle when the number of the turned off fourth indicator 448 increases.

As mentioned above, the controller 400 may be configured to calculate a time to collision with the other vehicle, which is driven from the rear lateral side to the rear side of the subject vehicle, based on the detection result of the rear lateral side detection unit, and turn on the fourth indicator 448 based on the calculated time to collision. According to another exemplary embodiment, the controller 400 may be configured to calculate a distance between the other vehicle and the subject vehicle, and turn on the fourth indicator 448 based on the calculated distance. The fourth indicator 448 may be configured to emit a single color, e.g. a red color, as the same as the second indicator 444. Alternatively, the fourth indicator 448 may be configured to have a color that is more similar to the red color as the time to collision with the other vehicle decreases, in the same way of the second indicator 444.

Figure 9:
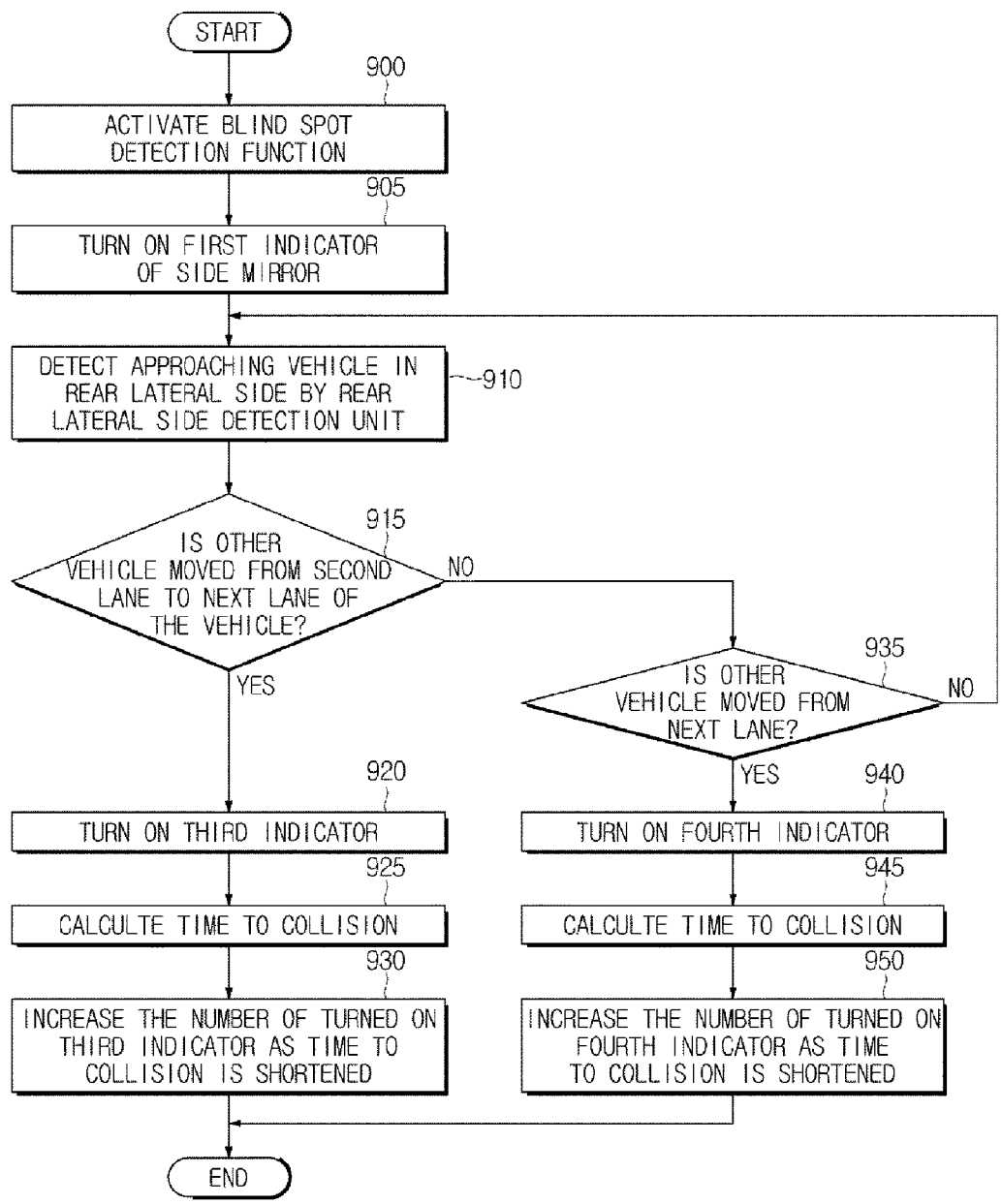

FIGS. 8 and 9 are flow charts of a control method of a vehicle in accordance with an exemplary embodiment. Referring to FIG. 8, when the blind spot detection function is activated (800), the first indicator 442 of the side mirror may be turned on (810) and when the rear lateral side detection unit detects another vehicle approaching in the blind spot (820), the second indicator 444 of the side mirror may be turned on (830).

When the blind spot detection function is activated, the first indicator 442 may be turned on, as illustrated in FIGS. 5A to 5C, to allow a driver to recognize that the blind spot detection function is activated. When the blind spot detection function is activated, the controller 400 may be configured to generate a signal to turn on the first indicator 442 to output the signal to the first indicator 442 to turn on the first indicator 442 in conjunction with the operation of the blind spot detection function.

When the blind spot detection function is activated, when the rear lateral side detection unit detects the other vehicle driven in the blind spot of the side mirror, the second indicator 444 may be turned on. As the distance between the detected other vehicle and the subject vehicle decreases, the controller 400 may be configured to increase the number of the turned on indicator 444 (840). According to an exemplary embodiment, the second indicator 444 of the side mirror may be provided such that the number of the turned on indicator is increased in a pre-determined direction as the location of the other vehicle driven in the blind spot approaches to the vehicle (e.g., the distance between the vehicles decreases). In other words, when the rear lateral side detection unit detects the other vehicle driven in the blind spot, the controller 400 may be configured to determine the number of the turned on second indicator 444 and a turning on direction of the second indicator 444, based on a distance between the detected other vehicle and the subject vehicle.

For example, as illustrated in FIG. 5A, when the other vehicle is detected in the blind spot, the controller 400 may be configured to calculate a distance between the detected other vehicle and the subject vehicle. In response to determining that the other vehicle is at a maximum distance to the subject vehicle within the blind spot (e.g., the other vehicle has just entered the blind spot), based on the calculated distance, the controller 400 may be configured to turn on two indicators disposed in the lowest among the second indicator 444. The controller 400 may be configured to pre-store data related to the number of the turned-on second indicator 444 based on the variation of the distance between the other vehicle in the blind spot and the subject vehicle.

When a distance between the other vehicle driven in the blind spot and the subject vehicle is less than as illustrated in FIG. 5A, based on the detection result of the rear lateral side detection unit, the controller 400 may be configured to determine the number of the turned on indicators corresponding to the decreased distance between the other vehicle in the blind spot and the subject vehicle, and may be configured to turn on two indicators more, which are consecutively arranged from the indicators that are already turned on, based on the determined number, as illustrated in FIG. 5B. In other words, according to an exemplary embodiment, the second indicator 444 may be configured to increase the number of the turned on indicators as the distance between the other vehicle in the blind spot and the subject vehicle decreases allowing a driver to recognize that the other vehicle is gradually approaching the vehicle.

Referring to FIG. 9, when the blind spot detection function is activated (900), the first indicator 442 of the side mirror may be turned on (905). When the rear lateral side detection unit detects the other vehicle approaching in a rear lateral side of the subject vehicle (910), the controller 400 may be configured to determine whether the detected other vehicle is moved from a second lane to a driving lane of the vehicle to a next lane to the driving lane of the subject vehicle (915). When the detected other vehicle is moved from a second lane to a driving lane of the subject vehicle to a next lane to the driving lane of the vehicle, the controller 400 may be configured to turn on the third indicator 446 (920). The controller 400 may then be configured to calculate a time to collision with the other vehicle (925) and increase the number of the turned-on third indicator 446, as the calculated time to collision decreases (930).

When the blind spot detection function is activated, the first indicator 442 may be turned on, as illustrated in FIGS. 7A and 7B, to allow a driver to recognize that the blind spot detection function is activated. When the blind spot detection function is activated, the controller 400 may be configured to generate a signal to turn on the first indicator 442 to output the signal to the first indicator 442 so that the first indicator 442 is turned on in conjunction with the operation of the blind spot detection function.

When the blind spot detection function is activated and when the rear lateral side detection unit detects that the other vehicle is approaching the rear lateral side of the subject vehicle, the third indicator 446 may be turned on. According to an exemplary embodiment, the third indicator 446 of the side mirror may be provided such that the number of the turned on third indicator 446 is increased in a predetermined direction as a time to collision with the other vehicle driven in the rear lateral side of the vehicle decreases. In other words, when the rear lateral side detection unit detects the other vehicle driven in the rear lateral side of the subject vehicle, the controller 400 may be configured to calculate a time to collision with the detected vehicle and determine the number of the turned-on third indicator 446, according to the calculated time to collision.

For example, as illustrated in FIG. 7A, when the other vehicle is detected to be moved from a second lane to a driving lane of the vehicle to a next lane to the driving lane of the subject vehicle, the controller 400 may be configured to calculate a time to collision with the detected vehicle. The controller 400 may then be configured to turn on a single third indicator 446 in the lowest thereof when the calculated time to collision is determined to be less than a predetermined reference time. The controller 400 may be configured to increase the number of the third indicator 446 by turning on one indicator that is consecutively arranged from the turned on indicators, as a time to collision with the other vehicle decreases. The controller 400 may be configured to pre-store data related to the number of the third indicator 446 turned on according to the variation of the time to collision with the other vehicle. In other words, the third indicator 446 may allow a driver to recognize that the other vehicle is gradually approaching the vehicle by increasing the number of the turned on third indicator 446 as a time to collision with the other vehicle decreases.

When the detected other vehicle is not moved from a second lane to a driving lane of the vehicle to a next lane to the driving lane of the subject vehicle, the controller 400 may be configured to determine whether the other vehicle is moved from a next lane of the vehicle (935), and when the other vehicle is moved from a next lane of the vehicle to the rear side of the subject vehicle, the controller 400 may be configured to turn on the fourth indicator 448 (940). The controller 400 may then be configured to calculate a time to collision with the other vehicle (945) and increase the number of the turned on fourth indicator 448 as the calculated time to collision decreases (950).

When the blind spot detection function is activated and when the rear lateral side detection unit detects that the other vehicle is approaching the rear side of the subject vehicle, the fourth indicator 448 may be turned on. According to an exemplary embodiment, the fourth indicator 448 of the side mirror may be provided such that the number of the turned on fourth indicator 448 is increased in a predetermined direction as a time to collision with the other vehicle driven in the rear side of the vehicle decreases. In other words, when the rear lateral side detection unit detects the other vehicle driven in the rear lateral side of the subject vehicle, the controller 400 may be configured to calculate a time to collision of the detected vehicle and determine the number of the turned on fourth indicator 448, according to the calculated time to collision.

As illustrated in FIG. 7B, when the other vehicle is detected to be moved from a next lane of a driving lane of the vehicle to the driving lane of the subject vehicle, the controller 400 may be configured to calculate a time to collision with the detected vehicle. The controller 400 may be configured to turn on two of the fourth indicator 448 in the most left side thereof when the calculated time to collision is determined to be less than a predetermined reference time. The controller 400 may then be configured to increase the number of the fourth indicator 448 by turning on two indicators that is consecutively arranged from the turned on indicators, as a time to collision with the other vehicle decreases. The controller 400 may be configured to pre-store data related to the number of the fourth indicator 448 turned on based on the variation of the time to collision with the other vehicle. In other words, the fourth indicator 448 may allow a driver to recognize that the other vehicle is gradually approaching the subject vehicle by increasing the number of the turned on fourth indicator 448 as a time to collision with other vehicle decreases.

As is apparent from the above description, according to the proposed vehicle and control method of the vehicle, it may be possible to warn differentially according to a degree of proximity of a vehicle driven in a blind spot.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

DESCRIPTION OF NUMERAL REFERENCE

400: controller
410: side camera
420: rear camera
430: blind spot detection radar
440: side mirror

What is claimed is:
1. A subject vehicle, comprising:
a rear lateral side detection unit configured to detect a rear lateral side including a blind spot, the rear lateral side detection unit including a rear camera, a side camera, and a blind spot detection radar;

a controller configured to calculate a distance between a vehicle detected in the blind spot and the subject vehicle and a time to collision of the detected vehicle with the subject vehicle in a driving lane of the subject vehicle based on a detection result of the rear lateral side detection unit, and to control an indicator of the side mirror based on information related to the calculation; and a side mirror including:
a mirror;
a first indicator disposed in the mirror and configured to be turned on when a blind spot detection function is activated; and
a second indicator having a plurality of indicators and configured such that the number of a turned-on indicator is increased in a predetermined direction as a distance between another vehicle, which is approaching in a blind spot to the subject vehicle decreases, based on a detection result of the rear lateral side detection unit, the number of the turned-on indicator previously stored based on a variation of the distance between the approaching other vehicle and the subject vehicle,
wherein the side mirror includes a third indicator having a plurality of indicators disposed in an edge of a lower lateral side of the side mirror, and
wherein the third indicator is configured such that the number of a turned-on indicator is increased in a predetermined direction, as a time to collision with the other vehicle, which is approaching in the driving lane of the subject vehicle while being moved from a second lane to a driving lane of the vehicle to a next lane to a driving lane of the vehicle, decreases based on a detection result of the rear lateral side detection unit, the number of the turned-on indicator in the third indicator previously stored based on a variation of the time to collision with the approaching other vehicle and the subject vehicle.

2. The vehicle of claim 1 wherein the second indicator is disposed in an edge of an upper portion of the mirror.

3. The vehicle of claim 1 wherein, the second indicator is arranged to correspond to the shape of the upper portion of the mirror.

4. The vehicle of claim 1 wherein, the first indicator and the second indicator are configured to emit each color that is different from each other.

5. The vehicle of claim 1, further comprising:
a controller configured to determine a location of the other vehicle driven in the blind spot based on a detection result of the rear lateral side detection unit, and configured to determine the number of a turned-on second indicator and a turning-on direction of the second indicator.

6. The vehicle of claim 1 further comprising:
a controller configured to calculate the time to collision with the other vehicle, which is approaching in the rear lateral side of the subject vehicle while being moved from the second lane to the driving lane of the vehicle to a next lane to the driving lane of the vehicle according to the detection result of the rear lateral side detection unit, and configured to determine the number of a turned-on third indicator and a turning-on direction of the third indicator, based on the calculated time to collision.

7. The vehicle of claim 1 wherein, the side mirror further comprises a fourth indicator having a plurality of indicators disposed in an edge of a lower portion of the side mirror.

8. The vehicle of claim 7 wherein, the fourth indicator is configured such that the number of a turned-on indicator is increased in a predetermined direction as the time to collision with the other vehicle, which is approaching from a next lane to the driving lane of the subject vehicle to the rear lateral side of the vehicle, decreases, based on a detection result of the rear lateral side detection unit.

9. The vehicle of claim 7 further comprising:
a controller configured to calculate the time to collision with the other vehicle, which is approaching from a next lane to the driving lane of the subject vehicle to the rear lateral side of the vehicle based on the detection result of the rear lateral side detection unit, and configured to determine the number of a turned-on fourth indicator and a turning-on direction of the fourth indicator, based on the calculated time to collision.

10. A control method of a subject vehicle, comprising:
turning on, by a controller, a first indicator of a side mirror when a blind spot detection function is activated;
turning on, by the controller, a second indicator of the side mirror when a rear lateral side detection unit detects another vehicle, which is approaching the subject vehicle in a blind spot;
increasing, by the controller, the number of a turned-on second indicator in a predetermined direction as a distance between the other vehicle and the subject vehicle decreases, based on a detection result of the a rear lateral side detection unit, the number of turned-on second indicator previously stored based on a variation of the distance between the approaching other vehicle and the subject vehicle;
turning on, by the controller, a third indicator of the side mirror when the rear lateral side detection unit detects the other vehicle, which is approaching in a driving lane of the subject vehicle while being moved from a second lane to the driving lane of the subject vehicle to a next lane to the driving lane of the subject vehicle;
calculating, by the controller, a time to collision with the other vehicle, which is approaching in the driving lane of the subject vehicle, according to a detection results of the rear lateral side detection unit; and
increasing, by the controller, the number of a turn-on third indicator in a predetermined direction as the calculated time to collision decreases, the number of the turned-on third indicator previously stored based on a variation of the time to collision of the approaching other vehicle and the subject vehicle,
wherein the rear lateral side detection unit includes a rear camera, a side camera, and a blind spot detection radar to detect the blind spot.

11. The control method of claim 10 wherein, the increasing of e number of a turned-on second indicator in a predetermined direction, includes:
determining, by the controller, a location of the other vehicle driven in the blind spot based on a detection result of the rear lateral side detection unit; and
determining, by the controller, the number of the turned-on second indicator and a turning-on direction of the second indicator, based on a degree of proximity to the subject vehicle in the determined location.

12. The control method of claim 10, further comprising:
turning on, by the controller, a fourth indicator of the side mirror when the rear lateral side detection unit detects the other vehicle, which is approaching from a next lane to the driving lane of the subject vehicle to the rear lateral side of the subject vehicle;

calculating, by the controller, the time to collision of the other vehicle, which is approaching in the rear lateral side of the subject vehicle, according to a detection result of rear lateral side detection unit; and increasing, by the controller, the number of a turned-on fourth indicator in a predetermined direction, as the calculated time to collision decreases.

\* \* \* \* \*